United States Patent [19]

Ninomiya et al.

[11] Patent Number: 4,909,598

[45] Date of Patent: Mar. 20, 1990

[54] NON-LINEAR OPTICAL DEVICE

[75] Inventors: Hidetaka Ninomiya; Miki Morita; Yoshitaka Takahashi, all of Hino, Japan

[73] Assignee: Konica Corporation, Tokyo, Japan

[21] Appl. No.: 384,984

[22] Filed: Jul. 24, 1989

[30] Foreign Application Priority Data

Jul. 30, 1988 [JP] Japan ................................ 63-191020
Dec. 26, 1988 [JP] Japan ................................ 63-326057

[51] Int. Cl.$^4$ ........................... G02B 1/04; G02F 1/35
[52] U.S. Cl. .............................. 350/96.34; 350/96.12; 350/96.29; 307/425; 307/430; 252/582
[58] Field of Search ................................ 307/425–430; 350/96.15, 96.16, 96.29, 96.30, 96.34, 96.12; 252/582, 583

[56] References Cited

U.S. PATENT DOCUMENTS

| | | | |
|---|---|---|---|
| 4,605,869 | 8/1986 | Choe | 307/425 |
| 4,624,872 | 11/1986 | Stuetz | 307/425 X |
| 4,720,567 | 1/1988 | Choe | 558/418 |
| 4,748,273 | 5/1988 | Fukuda et al. | 562/495 |
| 4,792,208 | 12/1988 | Ulman et al. | 350/96.34 |
| 4,801,659 | 1/1989 | Leslie | 307/425 X |
| 4,804,747 | 2/1989 | Allen et al. | 350/96.12 X |
| 4,807,968 | 2/1989 | Leslie | 307/425 X |

Primary Examiner—John D. Lee
Attorney, Agent, or Firm—Jordan B. Bierman

[57] ABSTRACT

A non-linear optical device applicable to use such as the generation of the higher harmonic waves and the parametric amplification of laser beam is disclosed. The device comprises a crystal of a compound represented by the following Formula I:

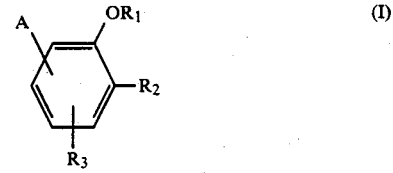

wherein A is an electron attractive group having 0 to 5 carbon atoms; $R_1$ is a hydrogen atom, an alkyl group or an alkenyl group; $R_2$ is a hydroxyl group, an acylamino group or a ureido group; and $R_3$ is a hydrogen atom or a mono-valent substituent.

8 Claims, No Drawings

NON-LINEAR OPTICAL DEVICE

FIELD OF THE INVENTION

This invention relates to an organic non-linear optical device applicable to the generation of the higher harmonic waves or to the parametric amplification of laser beam, and to the like.

BACKGROUND OF THE INVENTION

A non-linear optical effect is strikingly displayed when exposing a material to intensive light such as laser beams. Such effect can be applied to a second-order higher harmonic wave generation, i.e., SHG, a third-order higher harmonic wave, i.e., THG, an intensity modulation, a switching operation, an optical memory, and so forth. The application of the non-linear optical materials having non-linear optical effect to the optical devices of the next generation have focussed the spotlight of attention.

In recent years, many reasearches and developments of such non-linear optical materials have energetically been progressed. Especially about an SHG effect, it has been pointed out that organic type materials have a possibility to display extraordinarily higher efficiency in non-linear optical constant, a response speed, durability, and so forth, as compared to conventional inorganic type materials such as lithium niobate $LiNbO_3$, potassium dihydrogenphosphate KDP, and so forth which have been well known. Such an indication as mentioned above is found out in, for example, 'Organic Non-linear Optical Materials', compiled under the supervision of Masao Kato and HachirO Nakanishi, published by C. M. C. Company, Japan, 1985.

In the meantime, the crystal growth of non-linear optical materials, the devices using the non-linear optical materials, and so forth have also been studied extensively. In particular, there have been strong demands for obtaining an optical wave guide device capable of serving as a frequency conversion device utilizing SHG or THG, displaying a high conversion efficiency, and emitting uniform-phase rays of light.

The compounds having an SHG effect include, for example, 2-methyl-4-nitroaniline (MNA), 2-acetoamido-4-nitro-N,N-dimethylaniline (DAN), 2-acetoamido-4-nitro-1-pyrrolidinobenzene (PAN), 2-($\alpha$-methylbenzyl)amino-5-nitropyridine (MBA-NP), and so forth, each of which have been well known.

The above-given compounds are excellent materials among those having the SHG effect, because of the great non-linear optical effect. However, the organic non-linear optical materials typified by the above-given compounds can hardly obtain single crystals having a satisfactory size for serving as the core of the optical wave guide. It has therefore been very difficult to make them be the optical wave guide so as to serve as frequency conversion devices.

For example, a conventional fiber type optical wave guide device has been prepared in such a method that, after a highly refractive non-linear optical material is fused and injected into a hollow fiber made of a low refractive material, the crystallization thereof is carried out in Bridgman-Stockbarger method or the like. For further details, refer to D. S. Chemla., J. Zyss: Nonlinear Optical Properties of Organic Molecules and Crystals, Vol. 1; Academic Press, Inc., (1987).

However, it is generally said that the excellent core of an optical wave guide is difficult to prepare by making use of the conventionally known organic non-linear optical materials capable of displaying an excellent non-linear optical effect, because single crystals can hardly be formed in such a method as mentioned above. For example, PAN and MBA-NP may be unable to form any single crystal, because these materials are decomposed when they are fused.

Optical recording media are being studied extensively to try to satisfy the demans for making mass-storage and high-density information recording media. The recording density of these optical recording media depend on the wavelength of a light-source used, i.e., the recording density limit is increased at the inverse square of the wavelength of the light-source when the wavelength is shortened. Therefore, frequency conversion devices are greatly expected to obtain a light-source having a wavelength more shorter than ever. For example, it is expected to obtain blue rays of light from near-infrared rays light, light that is in the region of emitting semiconductor laser beam. However, most of the conventionally excellent organic non-linear optical materials such as MNA and DAN are yellow-colored and low in blue light transmittance. Such conventional materials have been disadvantageous to serve as a frequency conversion device capable of emitting blue rays of light, because they have a low transmittance of blue rays of light.

The above-mentioned facts have led a strong demand to the realization of organic non-linear optical materials which are ready to form single crystals and high in optical transmittance in the areas of visible rays of light including, especially, blue rays of light.

The original source of the non-linearity of an organic compound is an intramolecular $\pi$ electron, and polarizability $\beta$ of a second-order non-linear molecule becomes particularly greater when the compound has both of an electron-donative group and an electron-attractive group.

However, as is typified by p-nitroaniline, even if a non-linear polarization is great in molecular level, there may be many crystallized states where no SHG is shown at all or only a few SHG are shown. It is, therefore, impossible to judge whether a compound can show an excellent non-linear optical effect or not, by the polarizability $\beta$ of the second-order non-linear molecule used.

The present inventors studied the non-linear optical effect of compounds, the crystallization thereof, and the transmittance of visible rays of light. They have resultingly discovered the compounds each capable of displaying an excellent non-linear optical effect, eliminating the absorption of visible rays of light, and forming the crystals having a size good enough to readily make an optical wave guide.

SUMMARY OF THE INVENTION

It is accordingly an object of the invention to provide a non-linear optical device capable of eliminating the absorption of visible rays of light and displaying a high non-linear optical effect.

The above-mentioned objects of the invention can be achieved with a non-linear optical device comprising the crystal of a compound represented by the following formula I.

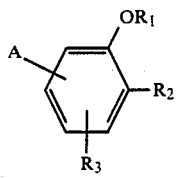

Formula I wherein A is an electron attractive group having 0 to 5 carbon atoms; $R_1$ is a hydrogen atom, an alkyl group or an alkenyl group; $R_2$ is a hydroxyl group, an acylamino group or a ureido group; and $R_3$ is a hydrogen atom or a monovalent substituent.

DETAILED DESCRIPTION OF THE INVENTION

The invention will now be more detailed below.

The above-mentioned electron attractive groups A are those having a Hammett's constant $\sigma p$ of not less than 0. They include, for example, nitro groups, cyano groups, alkylsulfonyl groups such as a methylsulfonyl group and an ethylsulfonyl group, formyl groups, carbamoyl groups such as a methylcarbamoyl group and a phenylcarbamoyl group, sulfamoyl groups such as a methylsulfamoyl group, alkoxycarbonyl groups such as a methoxycarbonyl group, an ethoxycarbonyl group, a buthoxycarbonyl group, a trifluoromethyl group, a succinimido group, halogen atoms such as those of bromine and chloride, heterocyclic groups such as an imidazolyl group, a thiazolyl group and a furyl group, dicyanovinyl groups, carboxy groups, and so forth. Among them, the groups each having not more than 3 carbon atoms are preferable and nitro groups, cyano groups, formyl groups and alkylsulfonyl groups are further preferable.

In Formula I, the alkyl groups represented by $R_1$ include, for example, an ethyl group, a propyl group, and an isopropyl group. These alkyl groups include those having substituents such as halogen atoms, e.g., those of bromine, chlorine and fluorine, alkoxy groups such as a methoxy group and an ethoxy group, hydroxyl groups and cyano groups;

The alkenyl groups represented thereby include, for example, an ethenyl group, a propenyl group, a butenyl group. These alkenyl groups include those having substituents such as those given for the substituents to the alkyl groups;

$R_1$ represents preferably an alkyl group and, more preferably, a substituted or unsubstituted methyl group.

Among the groups represented by $R_2$, acylamino groups include, for example, an acetoamido group and a benzamido group; and ureido groups include, for example, a methylureido group and a phenylureido group. Among them, a hydroxy group is preferable.

The groups represented by $R_3$ include a chlorine atom, a bromine atom, a nitro group, a cyano group, a methoxy group, an acetamido group and a methyl group as the preferable examples and a hydrogen atom as the most preferable example.

The compounds preferably applicable to the invention will now be exemplified below. It is, however, to be understood that the invention shall not be limited thereto.

Exemplified Compounds

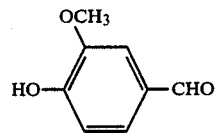 1.

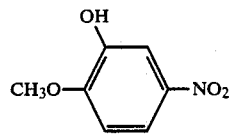 2.

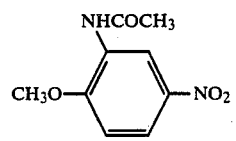 3.

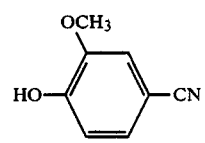 4.

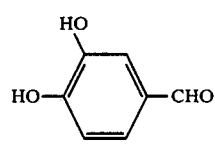 5.

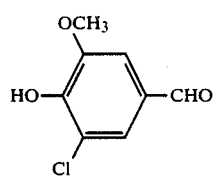 6.

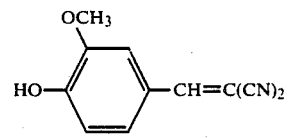 7.

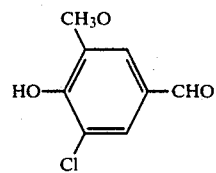 8.

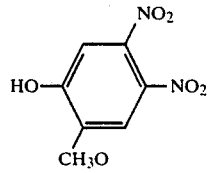 9.

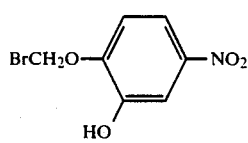 10.

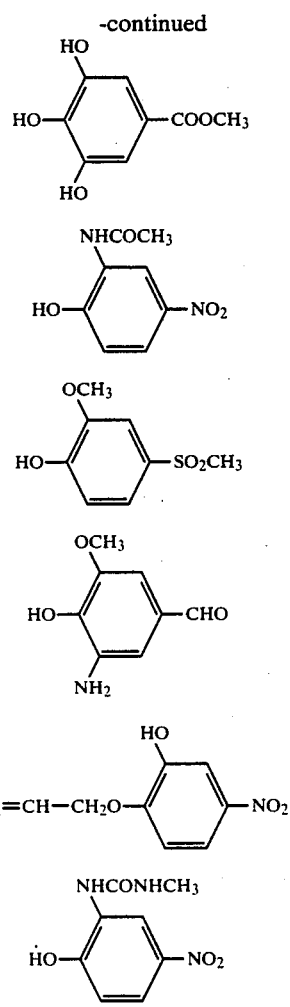

The compounds of the invention can readily be synthesized in a prevailing synthesizing method and some of the compounds are available as reagents on the market.

The non-linear optical devices relating to the invention are the optical wave guides which are fiber- or tabular-shaped or shaped by covering single crystals over with a cladding member, about which are described in, for example, the aforegiven literature and Japanese Patent O.P.I. Publication No. 63-77035(1988).

The single crystal growing method relating to the invention are described in the above-given literature. Among these methods, the preferable methods include, for example, Bridgman's method or Reverse Stockbarger's method, in which crystals are grown out of a fused solution.

The non-linear optical devices of the invention can be applied, for example, to the frequency conversion, i.e., a highly harmonic wave generation, intensity modulation and switching operation of laser beam, especially, near-infrared semiconductor laser beam.

EXAMPLES

Example 1

The exemplified compounds of the invention were heated up to a temperature 10° C. higher than the melting point thereof and the resulting fused solutions were injected into borosilicate glass-made hollow glass fiber having an outer diameter of 1.0 mm, an inner diameter of 7 μm and a length of 50 mm, by means of capillarity.

Thereafter, in Bridgman-Stockbarger method, the hollow glass fiber into which the fused compound solution had been injected was put in a heating furnace kept at a temperature 5° C. higher than the melting point of the compound. The glass fiber was pulled up from the furnace at a rate of 1 mm per hour and was then cooled down at room temperature to be crystallized.

The length of the single-crystallized portion was measured through a polarization microscope.

The results thereof are shown in Table 1.

TABLE 1

| Sample No. | Compound No. | Length of single crystal obtained* |
| --- | --- | --- |
| 1 | (1) Invention | A |
| 2 | (2) Invention | A |
| 3 | (4) Invention | A |
| 4 | (5) Invention | B |
| 5 | (7) Invention | B |
| 6 | (9) Invention | C |
| 7 | (11)Invention | C |
| 8 | PAN Comparative | D |
| 9 | MBA Comparative -NP | D |

* A:Length of not shorter than 10 mm,
B:Length from not shorter than 1 mm to shorter than 10 mm,
C:Length from not shorter than 0.2 mm to shorter than 1 mm, and
D:No single crystal obtained because of the decomposition of the materials being fused.

Example 2

From each of compounds 1, 2 and 3 prepared in Example 1, the single crystal fiber was cut into about 3 mm in length. Using a Q-switched Nd: YAG laser having a frequency of 10 pps, a pulse amplitude of 10 ns and a pulse energy of 320 mj, as the fundamental incident wave, i.e., YG660A having a wavelength of 1064 nm manufactured by Quantel International Co., U.S.A., the fundamental incident wave was attenuated and condensed to be guided from the edge section of the single crystal fiber. Resultingly, a ring-shaped second-order highly harmonic wave of green rays of light waas observed on a screen.

What is claimed is:

1. A non-linear optical device comprising a crystal of a compound represented by the following Formula I:

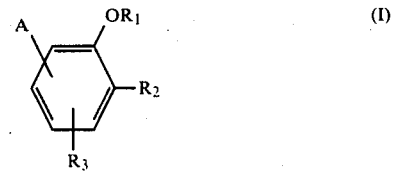

wherein A is an electron attractive group having 0 to 5 carbon atoms; $R_1$ is a hydrogen atom, an alkyl group or an alkenyl group; $R_2$ is a hydroxyl group, an acylamino group or a ureido group; and $R_3$ is a hydrogen atom or a mono-valent substituent.

2. The device of claim 1, wherein said A is a group having a Hammet's $\sigma p$ value of not less than zero.

3. The device of claim 2, wherein said A is a nitro group, a cyano group, a formyl group, a halogen atom, an alkylsulfonyl group, an alkoxycarbonyl group, a trifluoromethyl group, a dicyanovinyl group, a succinimido group or a heterocyclic group.

4. The device of claim 3, wherein said A is a nitro group, a cyano group, a formyl group or an alkylsulfonyl group.

5. The device of claim 1, wherein said device has a waveguide form.

6. The device of claim 5, wherein said device has a fibre form.

7. The device of claim 5, wherein said device has a tabular form.

8. The device of claim 5, wherein said device has a form in which a single crystal of said compound is surrounded by a cladding material.

* * * * *